US007868238B2

(12) United States Patent
Sugimoto et al.

(10) Patent No.: US 7,868,238 B2
(45) Date of Patent: Jan. 11, 2011

(54) ELECTRONIC MUSICAL APPARATUS, SERVER, ELECTRONIC MUSICAL SYSTEM, AND COMPUTER-READABLE MEDIUM INCLUDING PROGRAM FOR IMPLEMENTING CONTROL METHOD FOR THE APPARATUS, THE SERVER, AND THE SYSTEM

(75) Inventors: Ryotaro Sugimoto, Shizuoka (JP); Takeshi Ando, Hamamatsu (JP); Seiji Abe, Hamamatsu (JP); Shinya Sakurada, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 819 days.

(21) Appl. No.: 11/652,709

(22) Filed: Jan. 12, 2007

(65) Prior Publication Data

US 2007/0168289 A1 Jul. 19, 2007

(30) Foreign Application Priority Data

Jan. 18, 2006 (JP) ............................ 2006-010154
Jan. 18, 2006 (JP) ............................ 2006-010155

(51) Int. Cl.
*G01H 1/00* (2006.01)
*G10H 7/00* (2006.01)
*A63H 5/00* (2006.01)

(52) U.S. Cl. ............................ 84/600; 84/601; 84/609; 84/615; 84/645; 705/51

(58) Field of Classification Search .................. 84/600, 84/609, 601, 615, 645; 705/51
See application file for complete search history.

(56) References Cited

U.S. PATENT DOCUMENTS

| | | | | |
|---|---|---|---|---|
| 7,041,893 | B2 * | 5/2006 | Hasegawa et al. | 84/609 |
| 7,244,885 | B2 * | 7/2007 | Kageyama | 84/645 |
| 7,385,133 | B2 * | 6/2008 | Shibukawa | 84/645 |
| 7,390,954 | B2 * | 6/2008 | Mizuno | 84/609 |
| 7,482,526 | B2 * | 1/2009 | Yanase et al. | 84/600 |
| 7,634,801 | B2 | 12/2009 | Kizawa | |

(Continued)

FOREIGN PATENT DOCUMENTS

JP 10-240369 A 9/1998

(Continued)

OTHER PUBLICATIONS

Notification of Reasons for Rejection mailed Jun. 7, 2010, for JP Application No. 2006-010155, with English Translation, four pages.

(Continued)

*Primary Examiner*—Elvin G Enad
*Assistant Examiner*—Christina Russell
(74) *Attorney, Agent, or Firm*—Morrison & Foerster LLP

(57) ABSTRACT

An electronic musical apparatus which is shared by a plurality of users and is capable of making environmental settings for individual users without imposing burdens on the users. Authentication of biometric information or possession information on each user is performed, and environmental setting information for setting an environment of the electronic musical apparatus is stored in association with the biometric information or possession information on each user. Environmental setting information associated with the authenticated biometric information or possession information is read out, and an environment of the electronic musical apparatus is set based on the read environmental setting information.

8 Claims, 10 Drawing Sheets

U.S. PATENT DOCUMENTS

| | | | | |
|---|---|---|---|---|
| 2002/0002896 | A1* | 1/2002 | Hasegawa | 84/609 |
| 2003/0000368 | A1 | 1/2003 | Isozaki | |
| 2005/0144136 | A1* | 6/2005 | Murashita | 705/51 |
| 2005/0196131 | A1* | 9/2005 | Narusawa et al. | 386/46 |
| 2006/0241864 | A1* | 10/2006 | Rosenberg | 701/213 |
| 2006/0269051 | A1* | 11/2006 | Lucas | 379/114.01 |
| 2007/0089593 | A1* | 4/2007 | Hara | 84/645 |
| 2007/0226503 | A1* | 9/2007 | Sugimoto et al. | 713/172 |

FOREIGN PATENT DOCUMENTS

| | | | |
|---|---|---|---|
| JP | 2002-157040 | A | 5/2002 |
| JP | 2002-229388 | A | 8/2002 |
| JP | 2002-372970 | A | 12/2002 |
| JP | 2003-058160 | | 2/2003 |
| JP | 2004-133950 | A | 4/2004 |
| JP | 2005-210310 | A | 8/2005 |
| JP | 2005-351996 | A | 12/2005 |

OTHER PUBLICATIONS

Office Action mailed Feb. 9, 2010, for JP Application No. 2006-010154, with English Translation, five pages.

Office Action mailed Feb. 9, 2010, for JP Application No. 2006-010155, with English Translation, five pages.

* cited by examiner

ELECTRONIC MUSICAL APPARATUS, SERVER, ELECTRONIC MUSICAL SYSTEM, AND COMPUTER-READABLE MEDIUM INCLUDING PROGRAM FOR IMPLEMENTING CONTROL METHOD FOR THE APPARATUS, THE SERVER, AND THE SYSTEM

BACKGROUND OF THE INVENTION

1. Field of the Invention

The present invention relates to an electronic musical apparatus, a server, and an electronic musical system which can make environmental settings for individual users, as well as a computer-readable medium including a program for implementing a control method for the apparatus, server, and system.

2. Description of the Related Art

Conventionally, there have been known electronic musical apparatuses which can make environmental settings for individual users.

Examples of such electronic musical apparatuses include an electronic musical apparatus which stores environmental setting information on individual users as well as their ID numbers in the electronic musical apparatus or a server in advance, reads out environmental setting information associated with an ID number input by a user, and sets the environmental setting information in the electronic musical apparatus (see Japanese Laid-Open Patent Publication (Kokai) No. 2003-58160, for example).

The above conventional electronic musical apparatus, however, prompts a user to input an ID number using, for example, panel operating elements. Particularly, as is the case with many electronic musical instruments, if the electronic musical apparatus has no keyboard for directly inputting characters and numerics, it is very inconvenient to input ID numbers. Further, the above electronic musical apparatus has to prompt a user to intentionally carry out an operation of "inputting an ID number and reading out and setting his/her environmental setting information", which is burdensome for the user.

In addition, there may be cases where a user requests to reset environmental settings to environmental settings made at some point in the past, but the above conventional electronic musical apparatus cannot meet such user's requests.

SUMMARY OF THE INVENTION

It is a first object of the present invention to provide an electronic musical apparatus shared by a plurality of users and a server, which can make environmental settings for individual users without imposing burdens on the users, as well as a computer-readable medium including a program for implementing a control method for the apparatus and the server.

It is a second object of the present invention to provide an electronic musical apparatus and an electronic musical system which can make environmental settings for individual users without imposing burdens on the users and can be restored to past settings desired by the users, as well as a computer-readable medium including a program for implementing a method of controlling the apparatus and the server.

To attain the first object, in a first aspect of the present invention, there is provided an electronic musical apparatus shared by a plurality of users, comprising an authentication device that performs authentication of biometric information or possession information on each user, a storage device that stores environmental setting information for setting an environment of the electronic musical apparatus in association with the biometric information or possession information on each user, a reading device that reads out environmental setting information associated with the biometric information or possession information authenticated by the authentication device from the storage device, and a setting device that sets an environment of the electronic musical apparatus based on the environmental setting information read out by the reading device.

With the arrangement of the electronic musical apparatus according to the first aspect of the present invention, authentication of biometric information or possession information on each user is performed, environmental setting information associated with the authenticated biometric information or possession information is read out from the storage device that stores environmental setting information for setting an environment of the electronic musical apparatus in association with biometric information or possession information on each user, and an environment of the electronic musical apparatus is set based on the read environmental setting information. Thus, environmental settings can be made without requiring users to input ID numbers.

Preferably, the electronic musical apparatus further comprises a control device that provides control to operate the authentication device when power supply to the electronic musical apparatus is turned on.

With the arrangement according to the preferred form of the present invention, the authentication device is automatically activated when power supply to the electronic musical apparatus is turned on, so that environmental settings can be made while preventing users more reliably from being conscious of "reading out and setting their environmental setting information."

Preferably, the electronic musical apparatus further comprises a standby state maintaining device that maintains the authentication device in a standby state while maintaining the electronic musical apparatus in a standby state, and a control device that provides control to turn on power supply to the electronic musical apparatus when biometric information or possession information is detected by the authentication device.

With the arrangement according to the preferred form of the present invention, the authentication device is maintained in a standby state with the electronic musical apparatus being maintained in a standby state, and power supply to the electronic musical apparatus is turned on in response to detection of biometric information or possession information by the authentication device. Thus, authentication of biometric information or possession information and turning-on of the power supply to the electronic musical apparatus can be combined, so that environmental settings can be made while preventing users more reliably from being conscious of "reading out and setting their environmental setting information."

To attain the first object, in a second aspect of the present invention, there is provided an electronic musical apparatus shared by a plurality of users, comprising an authentication device that performs authentication of biometric information or possession information on each user, a setting device that sets an environment of the electronic musical apparatus, and a storage device that stores environmental setting information for reproducing the environment set by the setting device in association with presently authenticated biometric information or possession information when use of the electronic musical apparatus is terminated or when biometric information or possession information different from the presently authenticated biometric information or possession information is detected by the authentication device.

With the arrangement of the electronic musical apparatus according to the second aspect of the present invention, when use of the electronic musical apparatus is terminated or when biometric information or possession information different from presently authenticated biometric information or possession information is detected, environmental setting information for reproducing the environment is stored in the storage device in association with the presently authenticated biometric information or possession information. Thus, the last settings made by a user can be restored, and when the user uses the electronic musical apparatus next time, he/she can use it in a natural state.

To attain the first object, in a third aspect of the present invention, there is provided an electronic musical apparatus shared by a plurality of users, comprising an acquisition device that acquires biometric information or possession information on each user, a transmitting device that transmits the biometric information or possession information acquired by the acquisition device to a server that holds environmental setting information for reproducing an environment of the electronic musical apparatus in association with the biometric information or possession information on each user, a receiving device that receives the environmental setting information associated with the biometric information or possession information transmitted by the transmitting device from the server, and a setting device that sets an environment of the electronic musical apparatus based on the environmental setting information received by the receiving device.

With the arrangement of the electronic musical apparatus according to the third aspect of the present invention, biometric information or possession information on each user is detected and transmitted to the server that holds environmental setting information for reproducing an environment of the electronic musical apparatus in association with biometric information or possession information on each user, environmental setting information associated with the transmitted biometric information or possession information is received from the server, and an environment of the electronic musical apparatus is set based on the received environmental setting information. Thus, the same effects as those obtained by the electronic musical apparatus according to the first aspect can be obtained. Further, the size and capabilities of the electronic musical apparatus can be reduced, which reduces manufacturing cost and results in increased portability so that environmental settings can be made irrespective of locations.

To attain the first object, in a fourth aspect of the present invention, there is provided a server comprising a receiving device that receives biometric information or possession information transmitted from an electronic musical apparatus shared by a plurality of users, an authentication device that performs authentication of the biometric information or possession information received by the receiving device, a storage device that stores environmental setting information for setting an environment of the electronic musical apparatus in association with biometric information or possession information on each user of the electronic musical apparatus, a reading device that reads out environmental setting information associated with the biometric information or possession information authenticated by the authentication device from the storage device, and a transmitting device that transmits the environmental setting information read out by the reading device to the electronic musical apparatus.

With the arrangement of the server according to the fourth aspect of the present invention, biometric information or possession information transmitted from an electronic musical apparatus shared by a plurality of users is received, authentication of the received biometric information or possession information is performed, environmental setting information associated with the authenticated biometric information or possession information is read out from a storage device that stores environmental setting information for setting an environment of the electronic musical apparatus in association with biometric information or possession information on each user of the electronic musical apparatus, and the read environmental setting information is transmitted to the electronic musical apparatus. Thus, the same effects as those obtained by the electronic musical apparatus according to the third aspect can be obtained.

To attain the first object, in a fifth aspect of the present invention, there is provided an electronic musical apparatus shared by a plurality of users, comprising an acquisition device that acquires biometric information or possession information on each user, a setting device that sets an environment of the electronic musical apparatus, and a transmitting device that transmits environmental setting information for reproducing the environment set by the setting device and the acquired biometric information or possession information to a server when use of the electronic musical apparatus is terminated or when other biometric information or possession information is acquired by the acquisition device.

With the arrangement of the electronic musical apparatus according to the fifth aspect of the present invention, biometric information or possession information on each user is acquired, an environment of the electronic musical apparatus is set, and environmental setting information for reproducing the set environment and the acquired biometric information or possession information are transmitted to the server when use of the electronic musical apparatus is terminated or when other biometric information or possession information is acquired. Thus, the same effects as those obtained by the electronic musical apparatus according to the second aspect can be obtained. Further, the size and capabilities of the electronic musical apparatus can be reduced, which reduces manufacturing cost and results in increased portability so that environmental settings can be made irrespective of locations.

To attain the second object, in a sixth aspect of the present invention, there is provided an electronic musical apparatus comprising an authentication device that performs authentication of biometric information or possession information on a user, a storage device capable of storing a plurality of pieces of environmental setting information for setting environments of the electronic musical apparatus in association with the biometric information or possession information on the user, a selecting device that, when a plurality of pieces of environmental setting information associated with the biometric information or possession authenticated by the authentication device are stored in the storage device, selects any environmental setting information from among the stored plurality of pieces of environmental setting information, a reading device that reads out the environmental setting information selected by the selecting device, and a setting device that sets an environment of the electronic musical apparatus based on the environmental setting information read out by the reading device.

With the arrangement of the electronic musical apparatus according to the sixth aspect of the present invention, authentication of biometric information or possession information on a user is performed, any environmental setting information is selected from among a plurality of pieces of environmental setting information when the plurality of pieces of environmental setting information associated with the authenticated biometric information or possession are stored in the storage device, the selected environmental setting information is read out from the storage device, and an environment of the electronic musical apparatus is set based on the read environmental setting information. Thus, it is possible to read out and set environmental setting information stored at different times.

Preferably, the authentication device performs authentication of the biometric information or the possession information in a plurality of stages, and the reading device reads out environmental setting information in number or of a type according to a stage in which the biometric possession information or the possession information has been authenticated by the authentication device.

With the arrangement according to the preferred form of the present invention, authentication of the biometric information or the possession information is performed in a plurality of stages, and s environmental setting information in number or of a type according to a stage in which the biometric possession information or the possession information has been authenticated is read out from the storage device. Thus, the number or type of environmental setting information can be controlled according to the authentication stage.

Still preferably, the plurality of stages are determined according to whether user registration is performed or whether charging is performed.

With the arrangement according to the still preferred form of the present invention, the plurality of stages are determined according to whether user registration is performed or whether charging is performed. Thus, the user can obtain enhanced service by registering themselves as users and/or paying fees.

To attain the second object, in a seventh aspect of the present invention, there is provided an electronic musical system including an electronic musical apparatus and a server, the electronic musical apparatus comprising an acquisition device that acquires biometric information or possession information on a user, a transmitting device that transmits the biometric information or possession information acquired by the acquisition device to the server, a receiving device that receives environmental setting information from the server, and a setting device that sets an environment of the electronic musical apparatus based on the environmental setting information received by the receiving device, and the server comprising a receiving device that receives biometric information or possession information transmitted from the electronic musical apparatus, an authentication device that performs authentication of the biometric information or possession information received by the receiving device, a storage device capable of storing a plurality of pieces of environmental setting information for setting environments of the electronic musical apparatus in association with biometric information or possession information on the user, a selecting device that, when a plurality of pieces of environmental setting information associated with the biometric information or possession authenticated by the authentication device are stored in the storage device, selects any environmental setting information from among the stored plurality of pieces of environmental setting information, a reading device that reads out the environmental setting information selected by the selecting device, and a transmitting device that transmits the environmental setting information read out by the reading device to the electronic musical apparatus.

With the arrangement of the electronic musical system according to the seventh aspect of the present invention, the electronic musical apparatus has only to have at minimum the function of acquiring biometric information or possession information and the function of transmitting and receiving information since the most of the capabilities of the electronic musical apparatus are shifted to the server, and therefore the electronic musical apparatus can be reduced in size and manufacturing cost. Also, the reduction in the size of the electronic musical apparatus results in increased portability, and therefore environmental settings can be made irrespective of locations.

To attain the first object, in an eighth aspect of the present invention, there is provided a computer-readable storage medium including a program for causing a computer to execute a control method of controlling an electronic musical apparatus shared by a plurality of users, the method comprising an authentication step of performing authentication of biometric information or possession information on each user, a reading step of reading out environmental setting information associated with the biometric information or possession information authenticated in the authentication step from a storage device that stores environmental setting information for setting an environment of the electronic musical apparatus in association with biometric information or possession information on each user, and a setting step of setting an environment of the electronic musical apparatus based on the environmental setting information read out in the reading step.

With the arrangement of the computer-readable storage medium according to the eighth aspect of the present invention, the same effects as those obtained by the electronic musical apparatus according to the first aspect can be obtained.

To attain the first object, in a ninth aspect of the present invention, there is provided a computer-readable storage medium including a program for causing a computer to execute a control method of controlling an electronic musical apparatus shared by a plurality of users, the method comprising an authentication step of performing authentication of biometric information or possession information on each user, a setting step of setting an environment of the electronic musical apparatus, and a storage step of storing, in a storage device, environmental setting information for reproducing the environment set in the setting step in association with presently authenticated biometric information or possession information when use of the electronic musical apparatus is terminated or when biometric information or possession information different from the presently authenticated biometric information or possession information is detected in the authentication step.

With the arrangement of the computer-readable storage medium according to the ninth aspect of the present invention, the same effects as those obtained by the electronic musical apparatus according to the second aspect can be obtained.

To attain the first object, in a tenth aspect of the present invention, there is provided a computer-readable storage medium including a program for causing a computer to execute a control method of controlling an electronic musical apparatus shared by a plurality of users, the method comprising an acquisition step of acquiring biometric information or possession information on each user, a transmitting step of transmitting the biometric information or possession information acquired in the acquisition step to a server that holds environmental setting information for reproducing an environment of the electronic musical apparatus in association with biometric information or possession information on each user, a receiving step of receiving the environmental setting information associated with the biometric information or possession information transmitted by the transmitting device from the server, and a setting step of setting an environment of the electronic musical apparatus based on the environmental setting information received in the receiving step.

With the arrangement of the computer-readable storage medium according to the tenth aspect of the present invention, the same effects as those obtained by the electronic musical apparatus according to the third aspect can be obtained.

To attain the first object, in an eleventh aspect of the present invention, there is provided a computer-readable storage medium including a program for causing a computer to execute a control method of controlling a server, the method comprising a receiving step of receiving biometric information or possession information transmitted from an electronic musical apparatus shared by a plurality of users, an authentication step of performing authentication of the biometric information or possession information received in the receiving step, a storage step of storing, in a storage device, environmental setting information for setting an environment of the electronic musical apparatus in association with biometric information or possession information on each user of the electronic musical apparatus, a reading step of reading out environmental setting information associated with the biometric information or possession information authenticated in the authentication step from the storage device, and a transmitting step of transmitting the environmental setting information read out in the reading step to the electronic musical apparatus.

With the arrangement of the computer-readable storage medium according to the eleventh aspect of the present invention, the same effects as those obtained by the electronic musical apparatus according to the fourth aspect can be obtained.

To attain the first object, in a twelfth aspect of the present invention, there is provided a computer-readable storage medium including a program for causing a computer to execute a control method of controlling an electronic musical apparatus shared by a plurality of users, the method comprising an acquisition step of acquiring biometric information or possession information on each user, a setting step of setting an environment of the electronic musical apparatus, and a transmitting step of transmitting environmental setting information for reproducing the environment set in the setting step and the acquired biometric information or possession information to a server when use of the electronic musical apparatus is terminated or when other biometric information or possession information is acquired in the acquisition step.

With the arrangement of the computer-readable storage medium according to the twelfth aspect of the present invention, the same effects as those obtained by the electronic musical apparatus according to the fifth aspect can be obtained.

To attain the second object, in a thirteenth aspect of the present invention, there is provided a computer-readable storage medium including a program for causing a computer to execute a control method of controlling an electronic musical apparatus, the method comprising an authentication step of performing authentication of biometric information or possession information on a user, a selecting step of, when a plurality of pieces of environmental setting information associated with the biometric information or possession authenticated in the authentication step are stored in a storage device capable of storing a plurality of pieces of environmental setting information for setting environments of the electronic musical apparatus in association with the biometric information or possession information on the user, selecting any environmental setting information from among the stored plurality of pieces of environmental setting information, a reading step of reading out the environmental setting information selected in the selecting step, and a setting step of setting an environment of the electronic musical apparatus based on the environmental setting information read out in the reading step.

With the arrangement of the computer-readable storage medium according to the thirteenth aspect of the present invention, the same effects as those obtained by the electronic musical apparatus according to the sixth aspect can be obtained.

The above and other objects, features, and advantages of the invention will become more apparent from the following detained description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
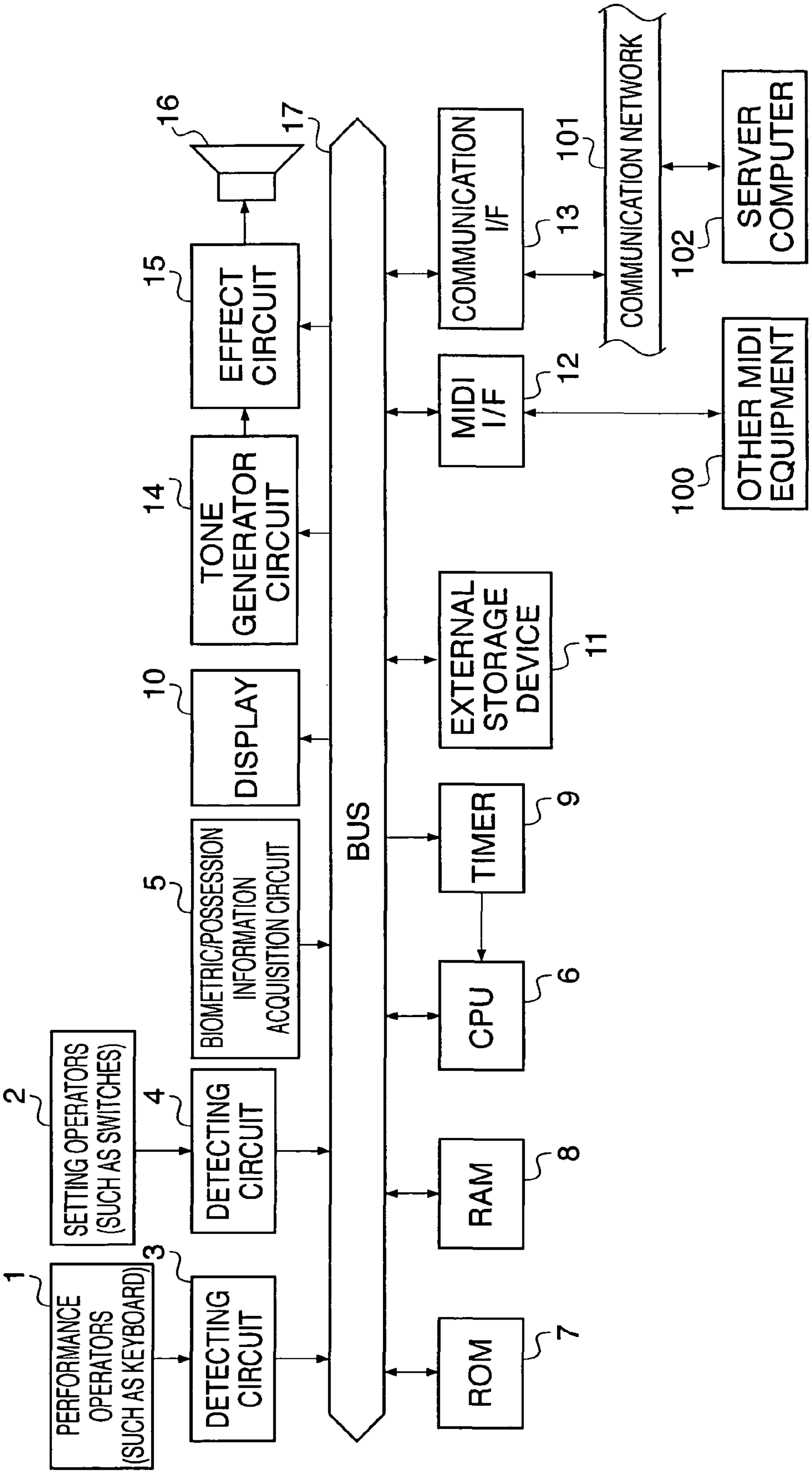
FIG. 1 is a block diagram schematically showing the construction of an electronic musical apparatus according to a first embodiment of the present invention.

FIG. 1 is a block diagram schematically showing the construction of an electronic musical apparatus according to a first embodiment of the present invention.

As shown in FIG. 1, the electronic musical apparatus according to the present embodiment is comprised of performance operating elements 1 including a keyboard for inputting pitch information; setting operating elements 2 including a plurality of switches, wheel, and joystick for inputting various information; a detecting circuit 3 for detecting operative states of the performance operating elements 1; a detecting circuit 4 for detecting operative states of the setting operating elements 2; a biometric/possession information acquisition circuit 5 for acquiring biometric information or possession information on each user; a CPU 6 that controls the entire apparatus; a ROM 7 that stores control programs executed by the CPU 6, various table data, etc.; a RAM 8 for temporarily storing musical composition data, various input information, computation results, etc.; a timer 9 that measures an interrupt time for timer interrupt processing and various kinds of time; a display 10 comprised of a liquid crystal display (LCD), light emitting diodes (LEDs), etc., for displaying various information and others; an external storage device 11 that stores various application programs including control programs, various musical composition data, various other data, etc.; a MIDI interface (I/F) 12 that inputs MIDI (Musical Instrument Digital Interface) messages from external devices and outputs MIDI messages to external devices; a communication interface (I/F) 13 that carries out transmission and reception of data to and from a server computer (hereinafter simply referred to as "the server") 102 via a communication network 101; a tone generator circuit 14 that converts performance data input by the performance operators 1, preset musical composition data, and other data into audio signals; an effect circuit 15 that applies various effects to audio signals from the tone generator circuit 14; and a sound system 16 that converts audio signals from the effect circuit 15 into sounds and is comprised of a DAC (Digital-to-Analog Converter), an amplifier, a speaker, etc.

The above component elements 3 to 15 are connected to one another via a bus 17. The timer 9 is connected to the CPU 6, other MIDI equipment 100 to the MIDI I/F 12, the communication network 101 to the communication I/F 13, the effect circuit 15 to the tone generator circuit 14, and the sound system 16 to the effect circuit 15. Here, the communication I/F 13 and the communication network 101 should not necessarily be wired, but may be wireless. Alternatively, one may be wired and the other may be wireless.

The biometric/possession information acquisition circuit 5 acquires biometric information or possession information on each user and stores the acquired biometric information or possession information in a biometric/possession information storage area, not shown, reserved at a predetermined location in the RAM 8 via the bus 17. Examples of biometric information include fingerprints, irises, voice patterns, veins, and faces although any type of information can be used insofar as they can identify users. Examples of possession information include information (such as IDs) written in noncontact cards (such as magnetic cards and IC (Integrated Circuit) cards), hardware tokens (such as USB tokens), and cellular phone units with built-in noncontact ICs. In view of user convenience, it is preferred that noncontact cards, cellular phone units with built-in noncontact ICs, faces, fingerprints, etc. are used. It should be noted that only either of biometric information and possession information may be acquired, and each individual may be authenticated based on the acquired information. In this case, the biometric/possession information acquisition circuit 5 has only to be equipped with either of a biometric information acquisition circuit and a possession information acquisition circuit. As a matter of course, the present invention is not limits to this, but the biometric/possession information acquisition circuit 5 may be equipped with both a biometric information acquisition circuit and a possession information acquisition circuit so that both biometric information and possession information can be acquired. In acquiring information, either or both of biometric information and possession information may be acquired in response to a user's instruction or automatically. Also, only one type of information may be acquired, but a plurality of types of information may be acquired and each individual may be authenticated based on the acquired plurality of types of information. In this case, the authentication accuracy is improved, but the authentication procedure becomes complicated, which places a heavy load on the CPU 6 when it has low computing power.

The external storage device 11 may be implemented, for example, by a flexible disk drive (FDD), a hard disk drive (HDD), a CD-ROM drive, or a magneto-optical disk drive (MO). The external storage device 11 may store the control programs executed by the CPU 6 as mentioned above. If one or more of the control programs are not stored in the ROM 7, the control program(s) may be stored in the external storage device 11, and by reading out the control program(s) from the external storage device 11 and storing the same in the RAM 8, the CPU 6 can operate in the same manner as if the control program(s) were stored in the ROM 7. This enables adding control programs and upgrading the version of the control programs with ease.

The communication I/F 13 is connected to the communication network 101 such as a LAN (Local Area Network), the Internet, or a telephone line as mentioned above and connected to the server 102 via the communication network 101. When one or more of the above programs and various parameters are not stored in the external storage device 11, the communication I/F 13 is used to download such programs and parameters from the server 102. An electronic musical apparatus as a client sends a command or commands for downloading one or more programs and parameters to the server 102 via the communication I/F 13 and the communication network 101. Responsive to this command, the server 102 distributes the requested program(s) and parameters to the electronic musical apparatus via the communication network 101, and the electronic musical apparatus receives the program(s) and parameters via the communication I/F 13 and stores them in the external storage device 11, thus completing the download.

The electronic musical apparatus according to the present embodiment is constructed on an electronic musical instrument as will be understood from the above construction. In the case where the electronic musical apparatus is implemented by an electronic musical instrument, the electronic musical instrument should not necessarily be a keyboard musical instrument, but may be a stringed instrument, a wind instrument, a percussion instrument, or the like.

A brief description will be given of a control process carried out by the electronic musical apparatus constructed as described above with reference to FIG. 2 first, and then a detailed description will be given of the control process with reference to FIG. 3.

Figure 2:
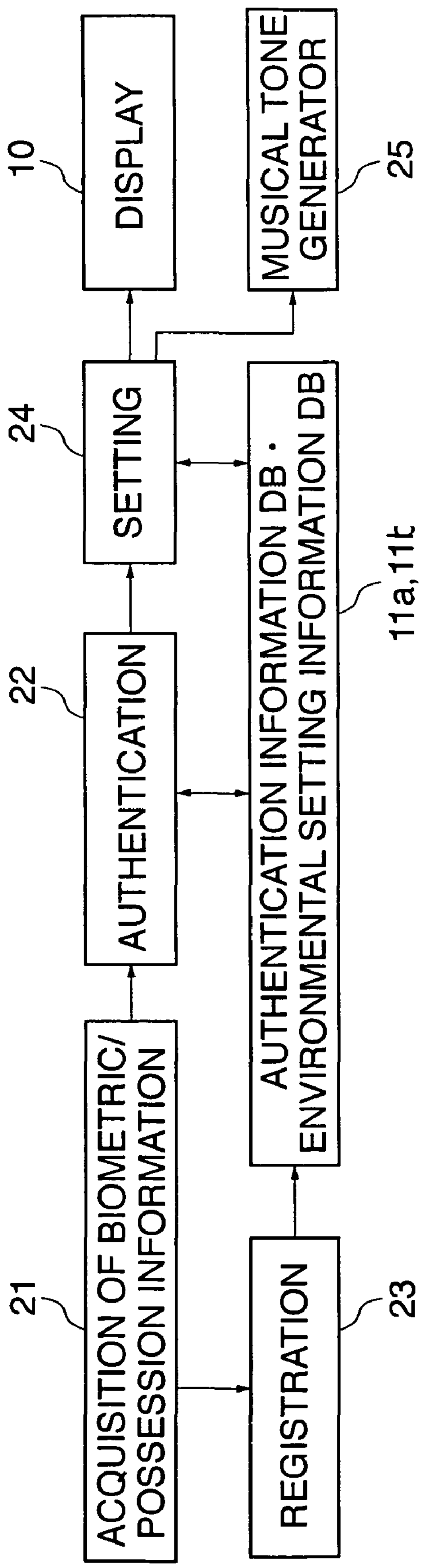
FIG. 2 is a block diagram showing the concept of a control process carried out by the electronic musical apparatus in FIG. 1.

FIG. 2 is a block diagram showing the concept of the control process carried out by the electronic musical apparatus according to the present embodiment.

As shown in FIG. 2, when biometric/possession information on a given user is acquired via the biometric/possession information acquisition circuit 5 (block 21), the CPU 6 performs authentication of the acquired biometric/possession information (block 22). The authentication of the acquired biometric/possession information is performed by determining whether or not the acquired biometric/possession information has been registered in an authentication information DB (database) 11*a* constructed, for example, on the external storage device 11. If, as a result of the authentication, it is determined that the acquired biometric/possession information has not been registered in the authentication information DB 11*a*, the acquired biometric/possession information is registered in the authentication information DB 11*a* (block 23).

After the biometric/possession information is registered in the authentication information DB 11*a* in the above-mentioned manner, when the user makes environmental settings using the setting operating elements 2 and finishes using the electronic musical apparatus according to the present embodiment (or when the user is replaced, and biometric/possession information on a new user is acquired), the CPU 6 associates environmental setting information for reproducing the set environment with the registered biometric/possession information and registers them in an environmental setting information DB 11*b* constructed, for example, on the external storage device 11 (block 24). Examples of environmental setting information include information for setting a user interface, tone color, tone volume, effects, automatic performance, and automatic accompaniment, tone color parameters and automatic performance data being created or edited. Either all or part of such information may be objects to be set. Also, other types of information may be objects to be set.

Next, when biometric/possession information on the same user as the user associated with the registered biometric/possession information is acquired via the biometric/possession information acquisition circuit 5, the CPU 6 performs authentication of the acquired biometric/possession information in the same manner as the above described manner (block 22). Since the acquired biometric/possession information has already been registered in the authentication information DB 11*a*, the CPU 6 reads out the environmental setting information registered in association with the acquired biometric/possession information from the environmental setting information DB 11*b* and sets the environmental setting information for the display 10 and a musical tone generator (comprised of the tone generator circuit 14 and the effect circuit 15) 25 (block 24). This setting provides the display 10 with a UI (user interface) associated with the read environmental setting information and provides the musical tone generator 25 with information about tone color, volume, effects, automatic performance, automatic accompaniment, etc. associated with the read environmental setting information. It should be noted that when a given user terminates the use of the electronic musical apparatus according to the present embodiment while creating or editing automatic performance data, tone color parameters, etc., these pieces of information may be registered in the environmental setting information DB 11*b*. In this case, when the same user uses the electronic musical apparatus according to the present embodiment again, the registered information can be read out and set in the RAM 8 or the like, and the state in which the automatic performance data, tone color parameters, etc. are being created or edited can be reproduced.

A detailed description will now be given of this control process.

Figure 3:
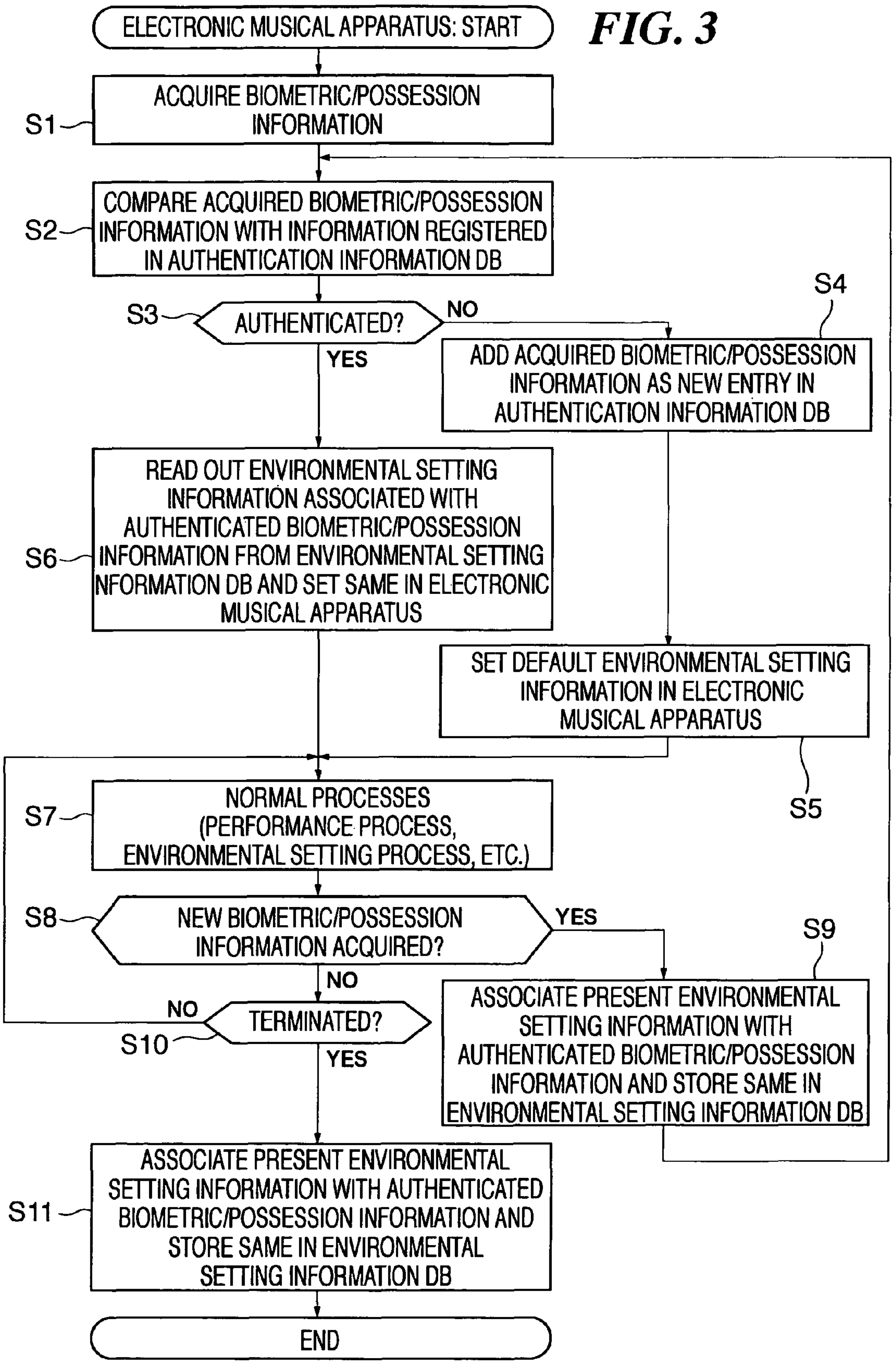
FIG. 3 is a flow chart showing the procedure of the control process carried out by the electronic musical apparatus in FIG. 1, in particular, by a CPU.

FIG. 3 is a flow chart showing the procedure of the control process carried out by the electronic musical apparatus according to the present embodiment, in particular, by the CPU 6. In this control process, the following processes are mainly carried out:

(1) a biometric/possession information acquisition/authentication process (steps S1 and S2);

(2) an authentication NG process (steps S4 and S5);

(3) an authentication OK process (step S6);

(4) a normal process (step S7):

(5) a process at acquisition of new biometric/possession information (step S9); and (6) a terminating process (step S11).

When a power source, not shown, for the electronic musical apparatus according to the present embodiment is turned on to start the electronic musical apparatus according to the present embodiment, the CPU 6 proceeds to the above-mentioned biometric/possession information acquisition/authentication process (1). In this biometric/possession information acquisition/authentication process (1), first, the biometric/possession information acquisition circuit 5 is enabled to acquire biometric/possession information. When the biometric/possession information acquisition circuit 5 acquires biometric/possession information on a given user, the biometric/possession information is stored in the biometric/possession information storage area of the RAM 8 as mentioned above (step S1). Next, biometric/possession information registered in the authentication information DB 11*a* and the biometric/possession information stored in the biometric/possession information storage area are compared with each other (step S2).

If, as a result of the comparison, the acquired biometric/possession information has not been authenticated, that is, if the acquired biometric/possession information has not been registered in the authentication information DB 11*a*, the CPU 6 proceeds to the above-mentioned authentication NG process (2). On the other hand, if the acquired biometric/possession information has been authenticated, that is, if the acquired biometric/possession information has been registered in the authentication information DB 11*a*, the CPU 6 proceeds to the above-mentioned authentication OK process (3).

In the authentication NG process (2), the acquired biometric/possession information is added as a new entry to the authentication information DB 11*a* (step S4), and then default environmental setting information is set in the electronic musical apparatus (step S5).

In the authentication OK process (3), environmental setting information associated with the authenticated biometric/possession information is read out from the environmental setting information DB 11*b* and set in the electronic musical apparatus (step S6).

Next, the CPU 6 proceeds to the above-mentioned normal process (4). In this normal process (4), a performance process in which the tone generator circuit 14 is caused to generate musical tones in response to a user's performance operation using the performance operating elements 1 or in response to reproduction of automatic performance data or automatic accompaniment data, an environmental setting process in which various performance parameters selected by the user using the setting operating elements 2 are set, and so forth are carried out.

Thereafter, when the biometric/possession information acquisition circuit 5 acquires new biometric/possession information, the CPU 6 proceeds to the above-mentioned process at acquisition of new biometric/possession information (5). In this process at acquisition of new biometric/possession information (5), environmental setting information required to reproduce the environment as the current setting is associated with the just-authenticated biometric/possession information and registered in the environmental setting information DB 11*b*, and after that, the CPU 6 proceeds to above-mentioned the biometric/possession information acquisition/authentication process (1) so as to authenticate the acquired new biometric/possession information.

Next, when the user terminates the operation of the electronic musical apparatus according to the present embodiment by depressing a power-on switch, not shown, the CPU 6 proceeds to the above-mentioned terminating process (6). In this terminating process (6), environmental setting information required to reproduce the environment as the current setting is associated with the presently authenticated biometric/possession information and registered in the environmental setting information DB 11*b*, and after that, main power supply to the electronic musical apparatus according to the present embodiment is stopped.

It should be noted that although in the present embodiment, when the use of the electronic musical apparatus is terminated or when the user is replaced and biometric/possession information on a new user is acquired, environmental setting information for reproducing an environment which is a current setting for the electronic musical apparatus is stored, the present invention is not limited to this, but at an arbitrary time point, environmental setting information at that point may be additionally stored. This goes for a second embodiment, described later.

As described above, according to the present embodiment, environmental setting information for reproducing an environment set by each user is automatically registered in association with authenticated biometric/possession information, and when the user uses the electronic musical apparatus next time, the previously set environment is set again. Thus, environmental settings for individual users can be made without imposing burdens on the users. Also, when power supply to the electronic musical apparatus according to the present embodiment is turned on, the biometric/possession information acquisition circuit 5 is enabled to acquire biometric/possession information, and acquisition and authentication of the biometric/possession information are automatically performed. Thus, environmental settings for individual users can be made without making the users very conscious of "reading out and set their own environmental setting information." Further, when the use of the electronic musical apparatus according to the present embodiment is terminated or when biometric/possession information different from presently authenticated biometric/possession information is detected, environmental setting information for reproducing the set environment is registered in association with the presently authenticated biometric/possession information in the environmental setting information DB 11*b*. Thus, the last setting made by each user can be restored, and when the user uses the electronic musical apparatus next time, he/she can use it in a natural state.

A description will now be given of an electronic musical apparatus according to a second embodiment of the present invention.

The electronic musical apparatus according to the present embodiment differs from the electronic musical apparatus according to the above described first embodiment only in part of its control process, and therefore the same hardware as that of the electronic musical apparatus according to the first embodiment, i.e. the hardware illustrated in FIG. 1 is used as hardware of the electronic musical apparatus according to the present embodiment.

The first feature of the electronic musical apparatus according to the present embodiment is to cooperate with the server 102 in carrying out the control process, which is carried out by only the electronic musical apparatus according to the first embodiment described above. The second feature is that users are classified into users of two types, i.e. a first type and a second type, and histories of environmental setting information are stored with respect to the second-type users, so that environmental setting information stored in the past can be retroactively read out and set in the electronic musical apparatus according to the present embodiment.

Figure 4A:
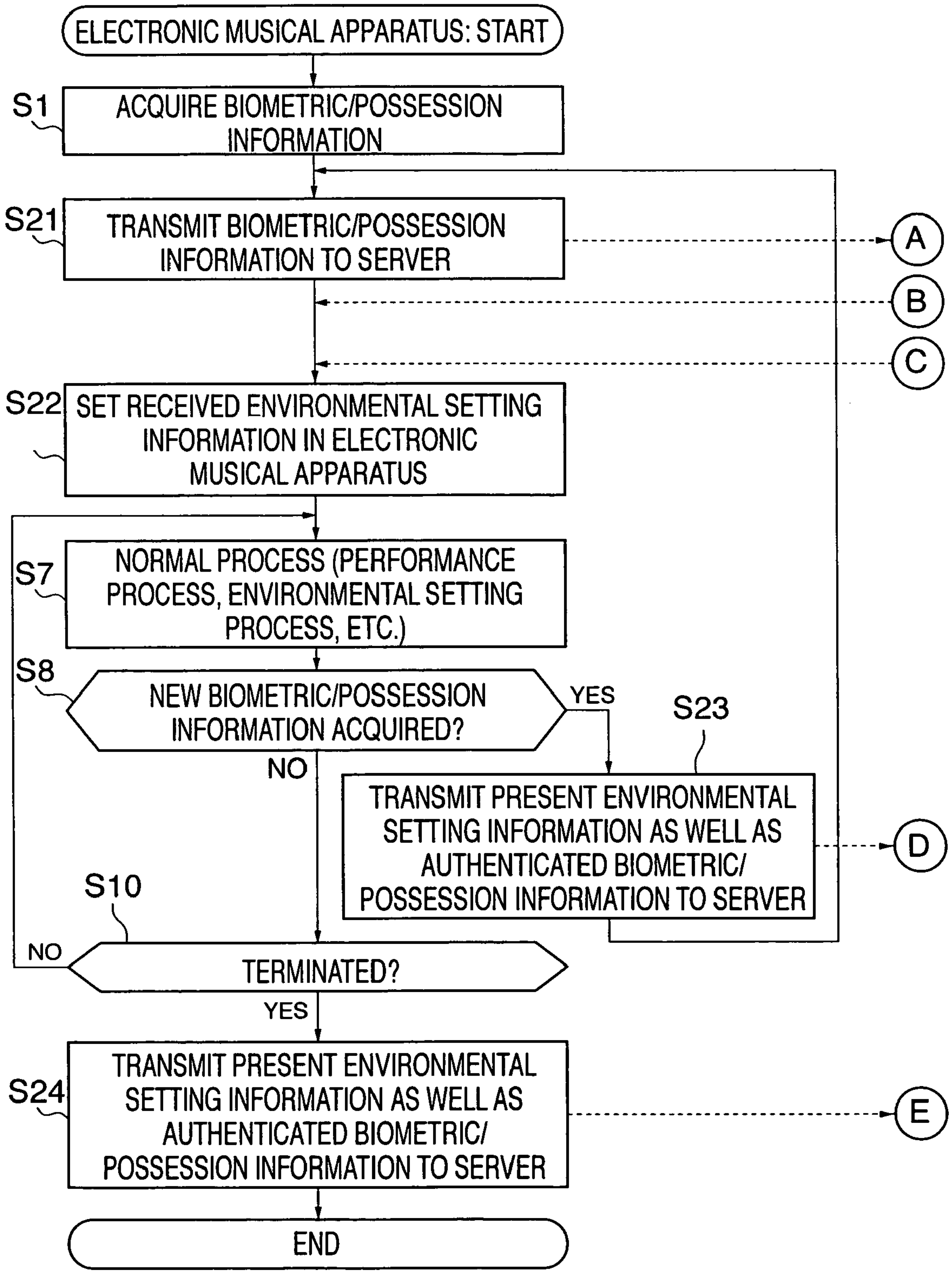
FIGS. 4A and 4B are flow charts showing the procedure of a control process carried out by an electronic musical apparatus and a server according to a second embodiment of the present invention.
Figure 4B:
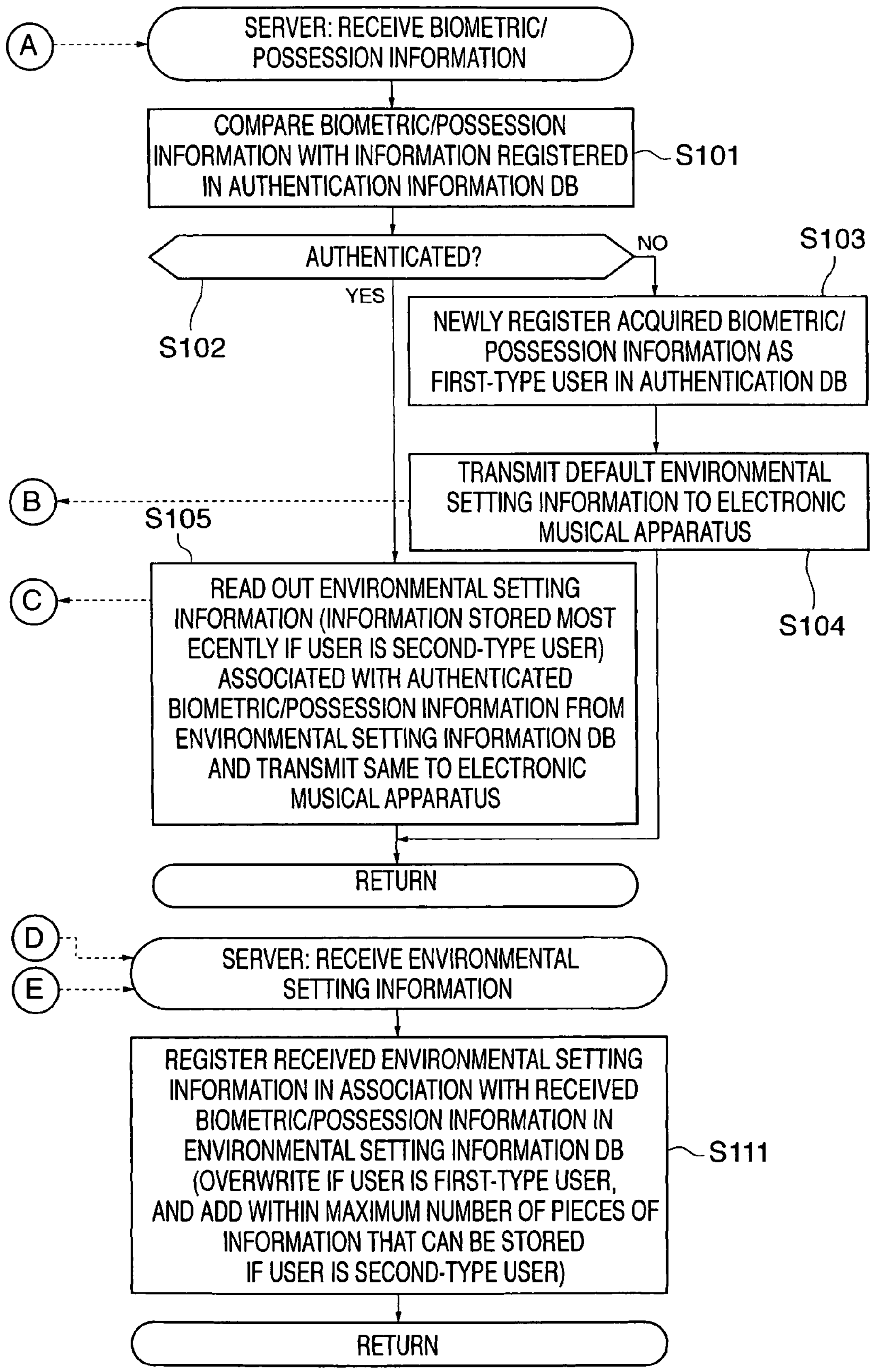

FIGS. 4A and 4B are flow charts showing the procedure of the control process carried out by the electronic musical apparatus according to the present embodiment and the server 102.

This control process is implemented by the electronic musical apparatus and the server 102 carrying out the control process described above with reference to FIG. 3. Specifically, the electronic musical apparatus carries out the following processes:

(11) a process in which biometric/possession information is acquired, and the acquired biometric/possession information is transmitted to the server 102 (steps S1 and S21);

(12) a process in which, when new biometric/possession information is acquired or when termination is instructed, present environmental setting information as well as presently authenticated biometric/possession information is transmitted to the server 102 (steps S23 and S24);

(13) a process in which the environmental setting information received from the server 102 is set in the electronic musical apparatus (step S22); and

(14) a normal process (step S7); and the server 102 carries out the following processes:

(21) a process in which the biometric/possession information transmitted from the electronic musical apparatus in the above-mentioned process (11) is received, and authentication of the received biometric/possession information is performed (step S101);

(22) an authentication NG process (steps S103 and S104);

(23) an authentication OK process (step S105); and

(24) a process in which the environmental setting information and the biometric/possession information transmitted from the electronic musical apparatus in the above-mentioned process (12) are received, and the received environmental setting information is associated with the received biometric/possession information and registered in an environmental setting information DB constructed on an external storage device, not shown, of the server 102 (step S111).

The control process carried out by the electronic musical apparatus according to the present embodiment can be easily inferred from the control process carried out by the electronic musical apparatus according to the first embodiment, and therefore description thereof is omitted.

The control process carried out by the server 102 can also be easily inferred from the control process carried out by the electronic musical apparatus according to the first embodiment, but the above-mentioned processes (22) to (24) include unique processes since users are classified into two types, and therefore these unique processes will be focused in the following description.

In the authentication NG process (22), the user is set to a first type and then added as a new entry to an authentication information DB constructed on the external storage device of the server 102 (step S103), and default environmental setting information is transmitted to the electronic musical apparatus (step S104).

Figure 5:
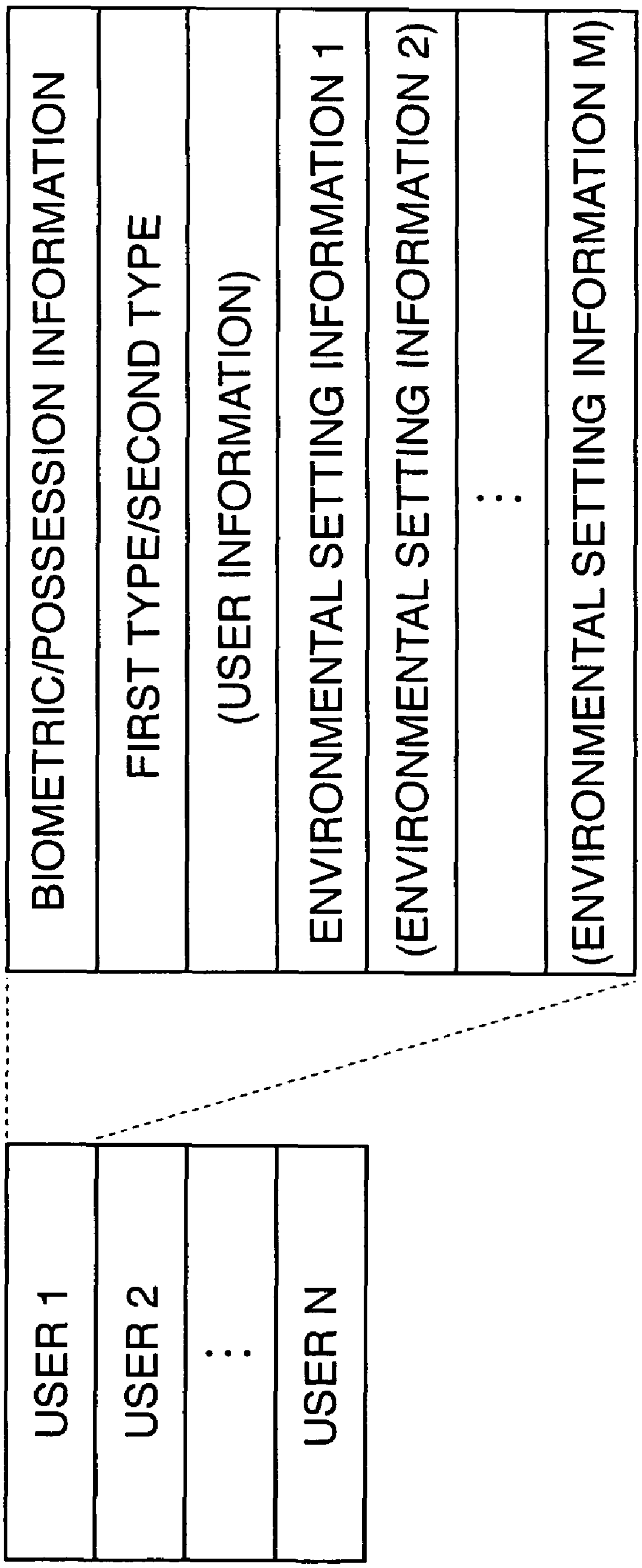
FIG. 5 is a diagram showing an example of the structure of data in an authentication information DB and an environmental setting information DB.

FIG. 5 is a diagram showing an example of the structure of data in the authentication information DB and the environmental setting information DB. The authentication information DB and the environmental setting information DB are implemented by one database (authentication information/environmental setting information database), in which areas where biometric/possession information, information indicative of whether a user is a first-type user or a second-type user, user information in the case where the user is a second-type user, and a plurality of pieces of environmental setting information are respectively stored are provided for each user. For the sake of convenience, information relating to authentication, i.e. a set of information comprised of biometric/possession information, information indicative of whether a user is a first-type user or a second-type user, and user information in the case where the user is a second-type user, is referred to as the authentication information DB, and a set of information comprised of environmental setting information is referred to as the environmental setting information DB. Thus, the authentication information DB and the environmental setting information DB are not constructed independently of each other on the external storage device of the server 102. As a matter of course, the present invention is not limited to this, but the authentication information DB and the environmental setting information DB may be constructed independently of each other on the external storage device of the server 102. Alternatively, the authentication information DB may be constructed on the external storage device 11 of the electronic musical apparatus according to the present embodiment, and the environmental setting information DB may be constructed on the external storage device of the server 102. (Alternatively, the authentication information DB may be constructed on the external storage device of the server 102, and the environmental setting information DB may be constructed on the external storage device 11 of the electronic musical apparatus according to the present embodiment.) It should be noted that terms inside parenthesis in FIG. 5 are indicative of areas where information is stored in the case where a user is a second-type user. As described later, users are set as second-type users when they have been registered, and accordingly, areas where user information input at the time of user registration are provided. As described above, when users are set as second-type users, histories of environmental setting information (a plurality of pieces of environmental setting information) are stored, and accordingly, a plurality of areas where the histories of environmental setting information are to be stored are also provided.

In the authentication OK process (23), environmental setting information associated with the authenticated biometric/possession information is read out from the environmental setting information DB of the server 102 and transmitted to the electronic musical apparatus (step S105). Here, if the user is a first-type user, it is possible to store only one piece of environmental setting information, and hence this piece of environmental setting information is read out. On the other hand, if the user is a second-type user, it is possible to store a plurality of pieces of environmental setting information as mentioned above, and hence a piece of environmental setting information stored most recently is read out. It should be noted that if a plurality of pieces of environmental setting information are stored, the user of the electronic musical apparatus according to the present embodiment may determine which piece of environmental setting information is to be read out. A control process therefor can easily be realized by a history list requesting and distributing process described later with reference to FIGS. 6A and 6B, and therefore description of the procedure of the control process is omitted.

In the registration process (24), if the user is a first-type user, the received environmental setting information is stored in one area in which environmental setting information is to be stored and which is associated with the received biometric/possession information (if the previous environmental setting information has been stored, it is overwritten with the received environmental setting information). On the other hand, if the user is a second-type user, the received environmental setting information is additionally stored in a plurality of areas in which environmental setting information is to be stored and which are associated with the received biometric/possession information. Here, in additionally storing the received environmental setting information, if a storage area is full, any piece of stored environmental setting information which has already been stored is selected and overwritten with new environmental setting information to be stored. Examples of methods for the selection include: (a) a method in which environmental setting information stored at the earliest time is selected, and (b) a method in which the user selects environmental setting information. Either of the methods (a) and (b) may be selected and set in advance, but the present invention is not limited to this. The user may select either of the methods (a) and (b).

According to the present embodiment, it is also configured such that the electronic musical apparatus requests the server 102 to transmit a history list which is a list of a plurality of pieces of environmental setting information stored in the server 102 and receives the history list transmitted from the server 102 in response to the request, the user selects any piece from the plurality of pieces of environmental setting information in the history list, and the electronic musical apparatus requests the server 102 to distribute the selected piece of environmental setting information and receives the environmental setting information distributed from the server 102 in response to the request and makes environmental settings based on the received environmental setting information.

Figure 6A:
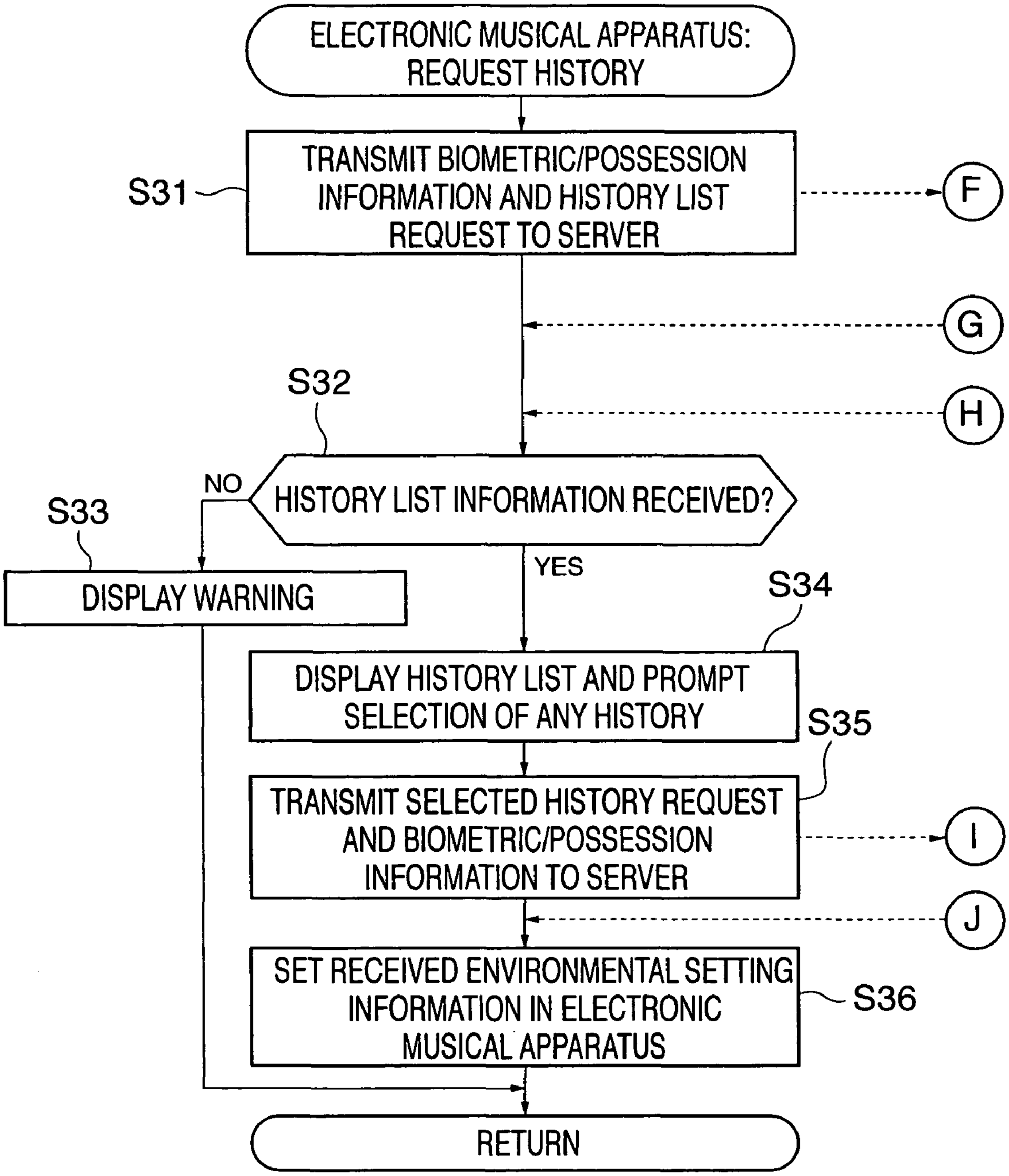
FIGS. 6A and 6B are flow charts showing the procedure of a history list requesting/distributing process carried out by the electronic musical apparatus and the server according to the second embodiment.
Figure 6B:
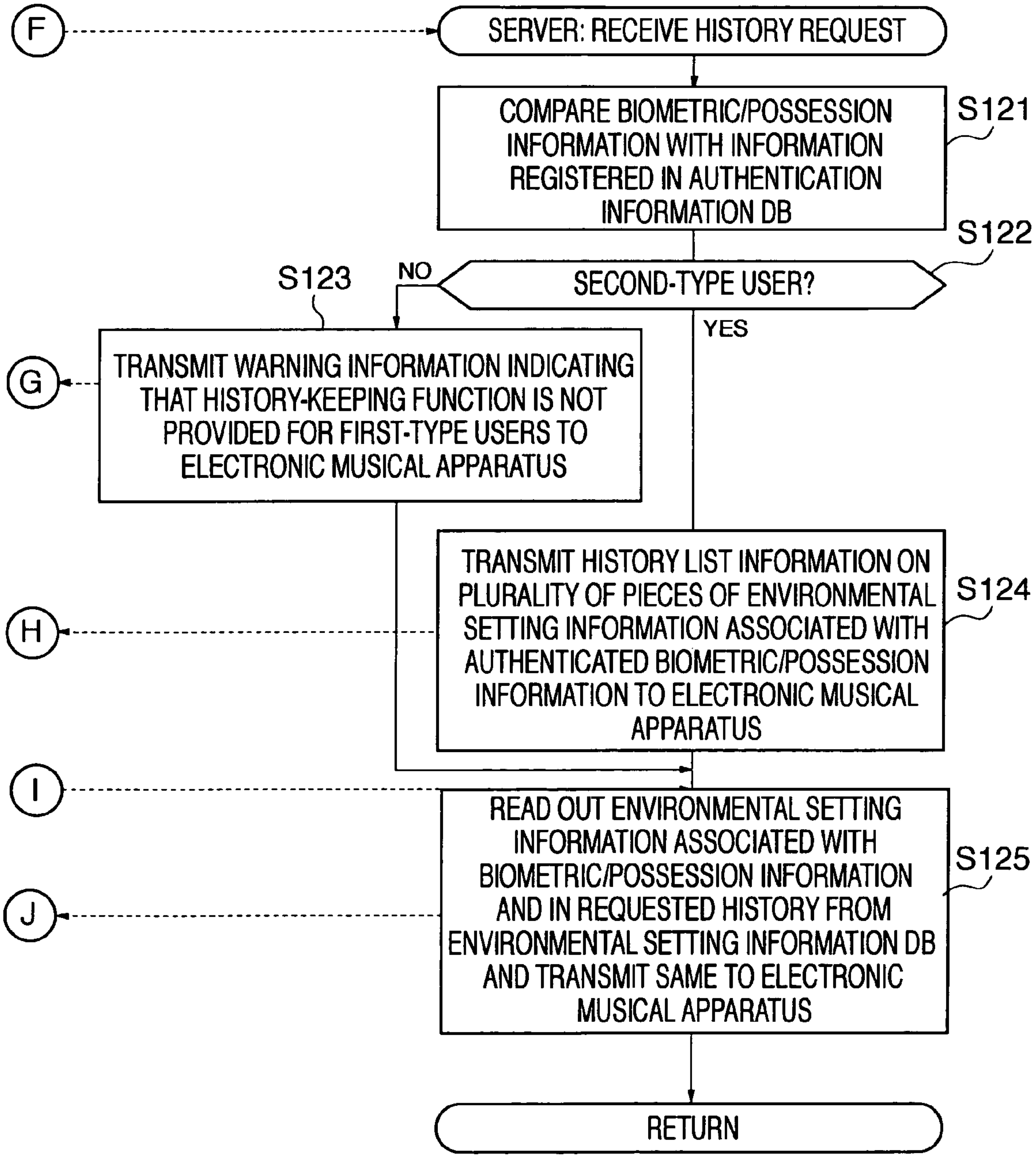

FIGS. 6A and 6B are flow charts showing the procedure of the history list requesting and distributing process carried out by the electronic musical apparatus according to the present embodiment and the server 102.

In the history list requesting and distributing process, the electronic musical apparatus according to the present embodiment carries out:

(31) a history list requesting process (step S31); and

(32) a history list receiving process (steps S32 to S36), and the server 102 carries out:

(41) a history list distributing process (steps S121 to S124); and

(42) an environmental setting information distributing process (step S125).

When the user requests the server 102 to distribute a history list, the electronic musical apparatus according to the present embodiment proceeds to the above-mentioned history list requesting process (31). In this history list requesting process (31), the electronic musical apparatus transmits biometric/possession information on the user and a history list request to the server 102 via the communication I/F 13.

Upon receiving the biometric/possession information and the history list request transmitted from the electronic musical apparatus, the server 102 proceeds to the above-mentioned history list distributing process (41). In this history list distributing process (41), first, the server 102 compares the received biometric/possession information with biometric/possession information on individual users registered in the authentication information DB (step S121). If, as a result of the comparison, the received barometric/possession information is information on a first-type user, a plurality of pieces of environmental setting information cannot be stored since only one piece of environmental setting information can be stored for first-type users (that is, no history-keeping function is provided for first-type users), and therefore the server 102 transmits warning information to the effect that no history-keeping function is provided for first-type users to the electronic musical apparatus (step S123). On the other hand, if, as a result of the comparison, the received barometric/possession information is information on a second-type user, the server 102 transmits history list information indicative of, for example, names of a plurality of environmental setting information associated with the biometric/possession information to the electronic musical apparatus (step S124).

When the warning information or the history list information is transmitted from the server 102, the electronic musical apparatus according to the present embodiment proceeds to the above-mentioned history list receiving process (32). In this history list receiving process (32), if the warning information was transmitted from the server 102, the electronic musical apparatus causes the display 10 to display a warning message to the effect that no history-keeping function is provided (step S33). On the other hand, if the history list information was transmitted from the server 102, the electronic musical apparatus causes the display 10 to display a history list according to the history list information and waits for a selecting operation by the user (step S34). When the user selects any of the names of the plurality of environmental setting information listed in the history list, the electronic musical apparatus transmits a request to distribute environmental setting information corresponding to the selected name (i.e. selected history request) and biometric/possession information on the user to the server 102 (step S35).

When the selected history request and the biometric/possession information on the user are transmitted from the electronic musical apparatus, the server 102 proceeds to the above-mentioned environmental setting information distributing process (42). In this environmental setting information distributing process (42), the server 102 reads out environmental setting information in the requested history associated with the transmitted biometric/possession information and transmits the environmental setting information to the electronic musical apparatus (step S125).

Upon receiving the environmental setting information transmitted from the server 102, the electronic musical apparatus according to the present embodiment sets the received environmental setting information in the electronic musical apparatus itself in the above-mentioned history list receiving process (32) (step S36).

Figure 7:
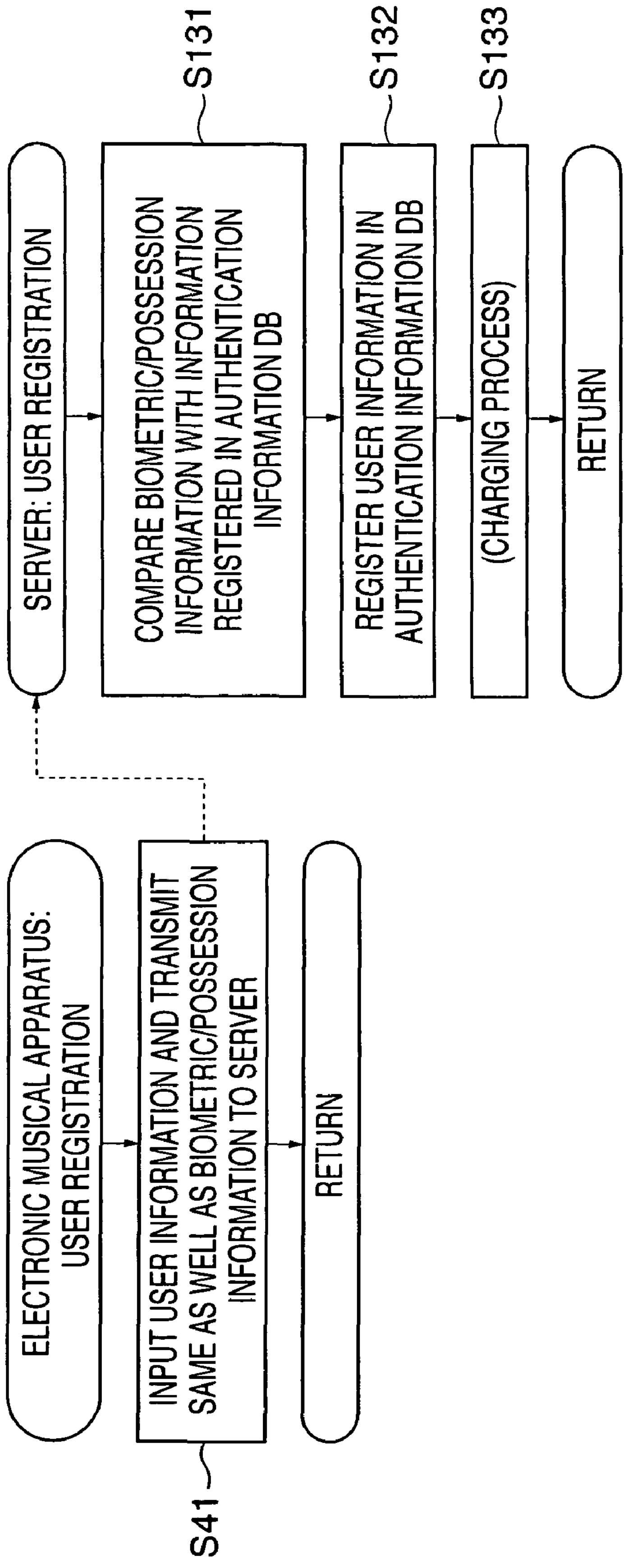
FIG. 7 is a flow chart showing the procedure of a user registration process carried out by the electronic musical apparatus and the server according to the second embodiment.

FIG. 7 is a flow chart showing the procedure of a user registration process carried out by the electronic musical apparatus according to the present embodiment and the server 102.

As shown in FIG. 7, when the user inputs his/her user information using, for example, the setting operating elements 2 of the electronic musical apparatus according to the present embodiment, the electronic musical apparatus according to the present embodiment transmits the input user information and biometric/possession information on the user to the server 102 (step S41).

Upon receiving the user information and the biometric/possession information transmitted from the electronic musical apparatus, the server 102 compares the received biometric/possession information with biometric/possession information on individual users registered in the authentication information DB and sets the user associated with the compared biometric/possession information as a second-type user (step S131). The server 102 then registers the received user information in the authentication information DB (step S132) and carries out a charging process if necessary (step S133).

As described above, according to the present embodiment, a plurality of environmental setting information can be stored in exchange for registration of user information (as well as charging if necessary).

Although in the present embodiment, the number of pieces of environmental setting information that can be stored differs according to whether users are firs-type users or second-type users (i.e. whether histories can be stored or not depends on whether users are first-type users or second-type users), the present invention is not limited to this, but types of information that can be stored may differ according to whether users are first-type users or second-type users. Specifically, only user interfaces may be stored for first-type users, whereas other settings as well as user interfaces (various musical tone parameter settings such as tone color, volume, and effects) may be stored for second-type users. Also, the number of user types should not necessarily be two, but may be three or more. For example, first-type users are classified as “persons who have not yet been registered as users”, second-type users are classified as “persons registered as free users”, and third-type users are classified as “persons registered as paying users”, and the number of pieces of environmental setting information that can be stored and types of environmental setting information that can be stored may differ according to user types.

As described above, according to the present embodiment, the electronic musical apparatus merely carries out acquisition of biometric/possession information, transmission of the acquired biometric/possession information to the server, reception of environmental setting information from the server, setting of the received environmental setting information, and transmission of present environmental setting information to the server. The server carries out authentication of the biometric/possession information, reading of environmental settings associated with the authentication result from the environmental setting information DB, distribution of the read environmental settings to the electronic musical apparatus, and registration of the present environmental setting information transmitted from the electronic musical apparatus in the environmental setting information DB. Thus, the electronic musical apparatus has only to have the function of acquiring biometric/possession information and the function of transmitting and receiving information, and therefore the electronic musical apparatus can be reduced in size and manufacturing cost. Also, the reduction in the size of the electronic musical apparatus results in increased portability, and therefore environmental settings can be made irrespective of locations. Further, even if the electronic musical apparatus is replaced with another one, its own environmental setting information can be acquired from the server and set, and therefore, for example, the same environment can be reproduced at a plurality of locations, e.g. at a home, a music school, and a concert hall and by a plurality of electronic musical apparatuses. Further, since users are classified into a plurality of types, and the number or types of environmental setting information differ according to user types, it is possible to control the number or types of environmental setting information according to user types. Also, regarding second-type users, environmental setting information stored at different times can be read out and set since a plurality of pieces of environmental setting information can be stored. Further, since user types are determined according to whether users are registered or unregistered or whether users are free users or paying users, users can obtain enhanced service if they register themselves as users and/or pay fees.

One of the features of the present embodiment is that histories of environmental setting information can be stored as described above, and the electronic musical apparatus according to the first embodiment does not have this feature. The present invention, however, is not limited to this, but the electronic musical apparatus according to the first embodiment may have this feature. If the electronic musical apparatus according to the first embodiment has this feature, it may be configured such that, as is the case with the present embodiment, users are classified into two types, i.e. the first type and the second type, and histories of environmental setting information are stored for second-type users so that environmental setting information stored in the past can be read out and set in the electronic musical apparatus according to the first embodiment. Also, changing the type of a given user from the first type to the second type may be carried out when he/she inputs user information and registers himself/herself as a user as is the case with the present embodiment. As distinct from the present embodiment, however, the electronic musical apparatus according to the first embodiment is of a so-called stand-alone type which does not exercise control in cooperation with the server but operates alone to exercises control. Since it does not make sense to make user registration on this type of apparatus, user registration is made on the server 102, and when user information which has been input is transmitted from the electronic musical apparatus to the server 102, the user type may be changed from the first type to the second type so that histories of environmental setting information can be stored.

A description will now be given of an electronic musical apparatus according to a third embodiment of the present invention.

The electronic musical apparatus according to the present embodiment differs from the electronic musical apparatus according to the first embodiment described above only in part of its control process, and therefore the same hardware as that of the electronic musical apparatus according to the first embodiment, i.e. the hardware illustrated in FIG. 1 is used as hardware of the electronic musical apparatus according to the present embodiment.

Figure 8:
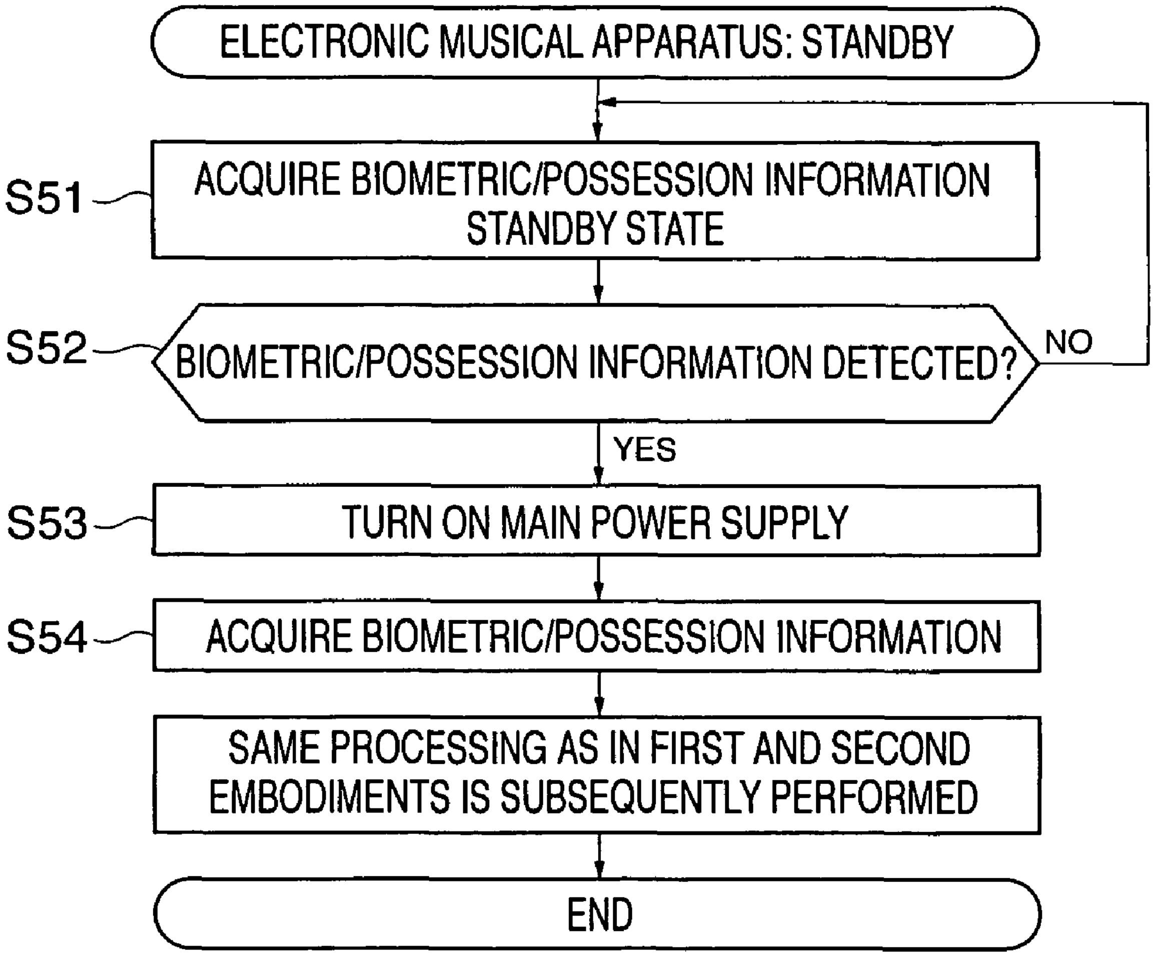
FIG. 8 is a flow chart showing the procedure of a control process carried out by an electronic musical apparatus according to a third embodiment of the present invention, in particular, by a CPU.

FIG. 8 is a flow chart showing the procedure of a control process carried out by the electronic musical apparatus according to the present embodiment, in particular, by the CPU 6.

As shown in FIG. 8, the CPU 6 constantly checks whether or not biometric/possession information has been detected in a standby state (i.e., a state in which only functions required to detect biometric/possession information are alive) (steps S51 and S52). When biometric/possession information is detected, the CPU 6 turns on a main power source, not shown (step S53) and acquires biometric/possession information from the biometric/possession information acquisition circuit 5 (step S54). Processing to be subsequently performed is the same as in first or second embodiment described above, and therefore description thereof is omitted.

As described above, according to the present embodiment, the biometric/possession information acquisition circuit 5 is maintained in a standby state with the electronic musical apparatus being maintained in a standby state, and power supply to the electronic musical apparatus is turned on in response to detection of biometric/possession information by the biometric/possession information acquisition circuit 5. Thus, authentication of biometric/possession information and turning-on of the power supply to the electronic musical apparatus can be combined, so that environmental settings can be made while preventing users more reliably from being conscious of "reading out and setting their environmental setting information."

It is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and a storage medium on which the program code is stored constitute the present invention.

Examples of the storage medium for supplying the program code include a floppy (registered trademark) disk, a hard disk, a magneto-optical disk, an optical disk such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program code may be downloaded from a server computer via a communication network.

Further, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiment may be accomplished by writing a program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. An electronic musical apparatus shared by a plurality of users, comprising:

an acquisition device that acquires biometric information or possession information written in one of a noncontact card, a hardware token, and a cellular phone unit with a built-in noncontact integrated circuit;

an authentication device that performs authentication of each user based on the acquired biometric information or possession information;

a setting operating element that sets an environment of the electronic musical apparatus;

a storage device that stores environmental setting information for reproducing the environment set by said setting operating element in association with the biometric information or possession information on each user; and a reading device that reads out environmental setting information associated with a predetermined biometric information or possession information authenticated by said authentication device from said storage device and reproduces the environment of the electronic musical apparatus based on the read out environmental setting information.

2. An electronic musical apparatus according to claim 1, further comprising a control device that provides control to operate said authentication device when power supply to the electronic musical apparatus is turned on.

3. An electronic musical apparatus according to claim 1, further comprising a standby state maintaining device that maintains said authentication device in a standby state while maintaining the electronic musical apparatus in a standby state, and a control device that provides control to turn on power supply to the electronic musical apparatus when biometric information or possession information is detected by said authentication device.

4. An electronic musical apparatus according to claim 1, further comprising a control device that provides control to store, in the storage device, environmental setting information for reproducing the environment currently set for the electronic musical apparatus in association with currently authenticated biometric information or possession information when use of the electronic musical apparatus is terminated or when new biometric information or possession information is detected by said authentication device.

5. The electronic music apparatus of claim 1, wherein the biometric information is acquired from at least one of a user's fingerprint, iris, voice pattern, vein, and face.

6. A computer-readable storage medium including a program for causing a computer to execute a control method of controlling an electronic musical apparatus shared by a plurality of users, the method comprising:

an acquisition step of acquiring biometric information or possession information written in one of a noncontact card, a hardware token, and a cellular phone unit with a built-in noncontact integrated circuit;

a first authentication step of performing authentication of each user based on the acquired biometric information or possession information;

a setting step of setting an environment of the electronic musical apparatus;

a storage step of storing, in a storage device, environmental setting information for reproducing the environment set in said setting step in association with biometric information or possession information on each user;

a second authentication step of performing authentication of predetermined biometric information or predetermined possession information on predetermined user;

a reading step of reading out environmental setting information from said storage device according to the predetermined biometric information or predetermined possession information, and reproducing the environment of the electronic musical apparatus based on the read out environmental setting information.

7. A computer-readable storage medium according to claim 6, wherein said control method further comprising:

a control step of providing control to store, in the storage device, environmental setting information for reproducing the environment currently set for the electronic musical apparatus in association with currently authenticated biometric information or possession information when use of the electronic musical apparatus is terminated or when new biometric information or possession information is detected.

8. The computer-readable storage medium of claim 6, wherein the biometric information is acquired from at least one of a user's fingerprint, iris, voice pattern, vein, and face.

* * * * *